(12) United States Patent
Bowsher et al.

(10) Patent No.: US 7,505,044 B2
(45) Date of Patent: Mar. 17, 2009

(54) UNIVERSAL ULTRA-HIGH DEFINITION COLOR, LIGHT, AND OBJECT RENDERING, ADVISING, AND COORDINATING SYSTEM

(76) Inventors: M. William Bowsher, P.O. Box 194, Lincoln, MA (US) 01773; Thomas S. Schwartz, P.O. Box 194, Lincoln, MA (US) 01773

( * ) Notice: Subject to any disclaimer, the term of this patent is extended or adjusted under 35 U.S.C. 154(b) by 789 days.

(21) Appl. No.: 09/919,559

(22) Filed: Jul. 31, 2001

(65) Prior Publication Data
US 2004/0012542 A1    Jan. 22, 2004

Related U.S. Application Data

(60) Provisional application No. 60/221,791, filed on Jul. 31, 2000, provisional application No. 60/243,040, filed on Oct. 25, 2000.

(51) Int. Cl.
*G09G 5/02* (2006.01)

(52) U.S. Cl. ..................................... 345/594

(58) Field of Classification Search ................. 345/589, 345/590, 591, 593–595
See application file for complete search history.

(56) References Cited

U.S. PATENT DOCUMENTS

| | | | | |
|---|---|---|---|---|
| 4,536,848 | A * | 8/1985 | d'Entremont et al. | ......... 358/1.1 |
| 4,737,921 | A * | 4/1988 | Goldwasser et al. | ......... 345/421 |
| 4,970,666 | A | 11/1990 | Welsh | |
| 5,021,705 | A * | 6/1991 | Yamamoto et al. | .......... 313/106 |
| 5,687,737 | A * | 11/1997 | Branham et al. | ............ 600/523 |
| 5,802,492 | A * | 9/1998 | DeLorme et al. | ......... 455/456.5 |
| 5,977,987 | A * | 11/1999 | Duluk, Jr. | ................... 345/441 |
| 5,986,670 | A * | 11/1999 | Dries et al. | .................. 345/629 |
| 6,122,391 | A | 9/2000 | Ringland | |
| 6,160,644 | A | 12/2000 | Lin | |
| 6,243,740 | B1 * | 6/2001 | Minneman et al. | .......... 709/206 |
| 6,268,860 | B1 * | 7/2001 | Bonello | ....................... 345/426 |
| 6,343,264 | B1 * | 1/2002 | Fenton et al. | ................... 703/6 |
| 6,446,053 | B1 * | 9/2002 | Elliott | ......................... 705/400 |
| 6,459,825 | B1 * | 10/2002 | Lippincott | ................... 382/312 |
| 6,574,616 | B1 * | 6/2003 | Saghir | ........................... 707/1 |
| 6,901,164 | B2 * | 5/2005 | Sheffer | ....................... 382/167 |
| 2001/0047250 | A1 | 11/2001 | Schuller | |
| 2002/0050518 | A1 * | 5/2002 | Roustaei | ..................... 235/454 |

(Continued)

FOREIGN PATENT DOCUMENTS

WO          WO02063458          8/2002

*Primary Examiner*—Sherali Ishrat
(74) *Attorney, Agent, or Firm*—O'Connell Law Firm

(57) ABSTRACT

A universal, ultra-high definition, accurate color, light, and object rendering, advising, and coordinating system for displaying colors, objects, and light and enabling an accurate rendering of a color, room, building, object, person, or landscape. The system includes an image procuring device for procuring input images, a memory device, a processor and a display device with all elements calibrated and coordinated to ensure that a color viewed and procured in situ by the image procuring device will be identically displayed on the display device. The system can combine reference images with display images in a consistent, scaled relationship and can display those images with a variety of lighting effects. Furthermore, the system can make design suggestions in light of designer input, design research, and historic information in furtherance of design goals while accommodating constraining elements. The system can be used relative to building structures, clothing, automobiles, persons, and a plurality of further structures, objects, and products.

33 Claims, 7 Drawing Sheets

U.S. PATENT DOCUMENTS

| | | |
|---|---|---|
| 2002/0080147 A1 | 6/2002 | Edge |
| 2003/0051255 A1* | 3/2003 | Bulman et al. .............. 725/135 |
| 2003/0057884 A1* | 3/2003 | Dowling et al. ............. 315/291 |
| 2006/0031486 A1* | 2/2006 | Miner ........................ 709/224 |

* cited by examiner

UNIVERSAL ULTRA-HIGH DEFINITION COLOR, LIGHT, AND OBJECT RENDERING, ADVISING, AND COORDINATING SYSTEM

This application claims benefit of the U.S. provisional patent application Ser. No. 60/221,791, filed on Jul. 31, 2000 and U.S. provisional patent application Ser. No. 60/243,040, filed on Oct. 25, 2000.

FIELD OF THE INVENTION

The present invention relates generally to display systems. More particularly, disclosed and protected by the present patent is a universal, ultra-high definition display method and system for advising regarding and coordinating color, light and objects.

BACKGROUND OF THE INVENTION

Color has been analyzed technically since at least as early as the discovery by Sir Isaac Newton in 1666 that sunlight contains all colors of the spectrum. Through this technical analysis, it has become clear that color is fundamentally different than tangible characteristics such as shape, size, weight, and the like in that color is purely visual. Color can be defined as the visual effect produced by the spectral composition of the light emitted, transmitted, or reflected by objects. With regard to sunlit objects seen by a human eye, the visual effect of color is the result of light passing from the sun as the source to the object and then to the detector, the eye and brain combination. The surface of the object absorbs all colors except that which is reflected to the detector.

As one skilled in the art will be well aware, traditional color theory is founded on the premise that red, yellow, and blue comprise the three primary colors. These can not be formed by mixing any combination of other colors, and all other colors are formed from mixing the three primary colors. Secondary colors green, orange, and purple are formed by combining two of the three primary colors while tertiary colors can be formed by mixing two secondary colors.

Interestingly, computer monitors typically use a red, green, blue (RGB) color model wherein those colors act as the foundation for color display. All other colors on a computer monitor yield from a combination of these basic colors. Conversely, computer printers typically depend on a different set of basic colors in that they are based on a cyan (a hue between blue and green), magenta (reddish purple), yellow, black (CMYK) color model. As a result, monitors and printers commonly reproduce colors differently.

This becomes particularly salient when one bears in mind that human beings are visually oriented mammals. Unlike many mammals whose primary senses are those of smell or hearing, our visual sense is primary. Furthermore, our vision is color sensitive and binocular (depth sensitive). There is no mistaking the importance of visual cues, especially those involving color, in our day-to-day existence. Many psychological studies have even demonstrated that certain environmental colors provoke hostility and anxiety, while other colors are conducive to rest or contemplation and still others will encourage responses such as eating more and the like.

With this, it is not surprising that so much time and money is spent to creatively employ color in almost every aspect of personal, commercial and industrial life, from products to environments. The ubiquitous new emphasis on color in interior design and interior decorating for residential, commercial and recently, even industrial spaces are primary examples. Interior decorators, even those with exceptional taste, commonly are challenged to provide a room interior that is both pleasant to behold and occupy while simultaneously remaining functional. The various components of wall and ceiling color, wall covering (i.e., wallpaper) color and pattern, window treatments (i.e., draperies and shades) type, color and pattern, floor covering type, color and pattern, and furniture style, color and pattern, and even accessories such as lamps, pictures, objet d'art, and the like, must all be properly coordinated to achieve a result that is both aesthetically pleasing and economically attractive. Similar requirements for coordination also apply to exterior components.

One might think that the simplest way to obtain a coordinated room would be to copy an acceptable design from a magazine or other published source. However, it is unlikely that a magazine design will optimize the individual desires of a consumer wishing to decorate a room. Furthermore, the consumer's room is unlikely to match physically the layout of the magazine room, and the depicted room certainly will not provide for any special furniture or accessories that a user wants to include or already owns. Still further, a magazine would not be likely to provide coordinated designs for the other rooms of the consumer's home. Therefore, a common method is to employ an interior designer and look at numerous paint and pattern samples in an attempt to select the ideal colors and patterns to coordinate a room's furnishings, relationship within itself, as well as the room's physical dimensions and relationship with other rooms of the home.

A good interior designer is usually able to narrow down the range of samples that must be viewed, but such a designer is likely to be expensive. Regardless of the price, the consumer may nonetheless end up with an environment that is more suited to the designer's taste than his or her own. If the consumer attempts to save money by making his or her own selections, the process is apt to be arduous, time consuming and frustrating. Either the interior designer or the consumer must ultimately look at myriad patterns in small-format, incomplete sample books and then attempt to integrate them with appropriate paint colors and upholstery patterns and colors, etc.

Unfortunately, it is almost impossible to project precisely from a tiny sample or color swatch what that color or sample will look like on a full size wall—a problem that creates frequent and unpleasant surprises that are difficult and expensive to rectify. While most people have sensitive color vision and can recognize slight color variations when the colors are placed side by side, the vast majority of people have extremely poor color memories. Thus, to attractively integrate and coordinate colors, those colors must be physically present. Finally, aside from the integration and coordination problem, few people have the ability even to select colors that please them when applied in their environments let alone the knowledge to use color dynamically to achieve its full potential.

As a result, it often becomes painfully apparent that colors and objects thought to compliment each other or work well together in a designer's mind clash or otherwise fail to attractively integrate or have the appearance desired or predicted by the designer when applied in an actual environment. The psychological impact of the colors chosen can be equally unpredictable, can fall far afield of what had been hoped for, and frequently can be ghastly. Relative to the exteriors of building structures, most observers will be able to recall numerous instances of home exteriors that appear to be a color experiment gone wrong. Colors one can presume the designer thought would compliment each other or work well together become glaring evidence of the difficulty of predicting the actual appearance of colors on a wall or a building structure.

As a result, some homes stand as ever-present reminders of the difficulties associated with interior and exterior design. In many other cases, designers intentionally use bland colors (i.e., white) to eliminate the possibility of colors that clash and the difficulty of choosing the right colors. Unfortunately, although the color white certainly can be useful and attractive in many instances, employing the color white as a default color leads to its overuse and an overall blandness of the many home and building exteriors and interiors that use it as a safety net. Indeed, the vast majority of home and building owners and users resign themselves, due to the time, aggravation and expense of another potentially fruitless experiment, to live with a less than optimal environment.

The astute observer may be aware that the aforementioned difficulties in predicting color coordination and appearance may be greatly exacerbated by the color quality of a color's illumination. Most people have had the experience of purchasing an article at a store and then discovering that it appears to be a very different color when taken home. Colors often appear quite different under the cool white fluorescent lighting of most stores from their appearance under incandescent lighting or natural lighting found in most homes.

Systems have been disclosed by the prior art that provide a computer "rendering" in which an image of a room can be altered or rendered by the computer so that the walls, floors, and window coverings take on the appearance of desired colors or patterns. Thus, the computer can make a room image give the effect of the materials chosen by the designer or the consumer. This has been found to be a useful way to visualize a combination of colored or patterned materials. Disadvantageously, in these prior art systems, there is generally no guarantee that the spectral results will be accurate.

In particular, one knowledgeable in the art will be aware of the system patented by Engeldrum, et al. under U.S. Pat. No. 5,638,117 entitled Interactive Method and System for Color Characterization and Calibration of a Display Device. That invention has achieved commercial success relative to displaying apparel and other objects under the federally registered trademark TRUE INTERNET COLOR. In that disclosure, the inventors noted, quite correctly, that the physical and electrical characteristics of color display monitors are substantially variable even among monitors of the same type. As a result, color rendition varies significantly from device to device. Ambient lighting further affects the perceived color produced by a monitor. The inventors noted that it is desirable that images appear with the same perceived color for various users of various monitors.

Accordingly, Engeldrum et al. developed and patented a system and method for determining color rendition in an imaging device including a contrast reference providing a black reference area and a white reference area, a gamma reference that provides a halftone reference area and a continuous tone reference area, a black point reference that provides another black reference area and a color intensity reference area, a white point color temperature reference providing another white reference area, and a matching card having known visual characteristics for comparing with one of the references. The references can be images produced by the imaging device. With this, ideally, true colors can be displayed.

As such, it will be clear that, in many prior art systems, outputted color images and inputted original images have not appeared substantially identical with regard to color. Because the color characteristics of the input and output devices are not identical, original colors are not exactly reproduced even on the same type of paper. For example, when an original color image is digitized by a scanner, certain light spectra are distorted by the conversion characteristic of the scanner. Similarly, when the digitized image is outputted on a sheet of paper, certain color output is distorted during printing. As a result, the printed color image does not appear true to the original color image.

According to "Computer Graphics, Principles and Practice" by Foley et al. (1995), to a human observer, a color is perceived based on three qualities: hue, saturation and lightness/brightness. Hue distinguishes among colors such as red, green, purple and yellow. Saturation refers to an amount of whiteness in a particular color. For example, pink is unsaturated with respect to red. Lightness is perceived as intensity of a reflecting object while brightness is the perceived intensity of a self-luminous object such as a color display monitor. In contrast to the above-described qualities based upon human perception, another set of terms in colorimetry includes dominant wavelength, excitation purity and luminance that roughly correspond to hue, saturation and lightness/brightness. Among the human perceptible colors specified by the above set of values, most colors may be generated by adding the primary colors (i.e. red, yellow, and blue). However, to match all values of dominant wavelength in the visible spectrum, certain colors cannot be produced by adding positive values of the primary colors.

Although prior art methods and systems have improved the color management involving a display monitor, color matching, such as between a paper medium and a CRT display, typically did not take ambient light condition into consideration. Thus, when the color is displayed on the CRT based upon a luminance value, the human observer does not identically perceive the color patch under the ambient light and the displayed color on the CRT. For color matching and coordination on a monitor to be exact, it must be done either in a control booth or in a room where the source and type of lighting is strictly controlled. As the present inventors have appreciated, this is important to note since, no matter how well coordinated and calibrated a given system is, one can not, for example, view a monitor under fluorescent light expecting the displayed colors to have the same appearance that they would have under natural or incandescent light.

On another note, one will appreciate that computer aided design ("CAD") programs also are known in the art. These programs allow for the design of proposed projects and structures, as well as the creation of three-dimensional models of those structures. However, traditional CAD programs have not allowed a user to utilize accurate color digitized photographic images of the user's actual home, yard, interior room, office or industrial space as a fixed composition background against which it is possible to manipulate digitized photographic images of building, home improvement and landscaping products from real manufacturers to create an accurate, realistic photographic rendering of the products in actual individualized use.

Various graphics and drawing programs are also known in the art. Programs such as Corel Draw, Adobe Photoshop and similar programs allow users to "cut and paste" images onto a composite background image and to fill a particular area with a pattern. Some of these graphics and drawing programs also allow the pasted images to remain as objects over the composite background image. Programs have been proposed which allow a user to preview a few selected images of certain home improvement products against a predefined digitized background image of an interior room or other interior or exterior portion of a house, office, industrial space, other building, or the like.

For example, U.S. Pat. No. 4,970,666, to Welsh, et al., teaches a system for producing video images that depict the appearance of a simulated structure in a video-derived image of the actual environment. The system disclosed in the '666 patent does not, however, provide for access to information about the image elements from a database by means of linking the information with the images of the products as they are manipulated or moved over the background image of the actual environment. Further, the '666 patent does not provide for access to information related to the image elements placed over or merged with a background by means of an interface associated with a computer generated screen display. Yet further, the system in the '666 patent lacks the ability to manipulate image objects (e.g., object resizing, distorting, edge smoothing, etc.) of actual products (in the form of digital images) over the background image.

Advantageously, U.S. Pat. No. 5,986,670 relates to digital image processing, more particularly, to a method and apparatus for producing a computer generated display that permits visualization of changes to the exterior or interior of any building structures. There, the invention includes a computer system for producing computer generated displays, including Windows-format displays, that permit visualization of changes to a building or structure, particularly to the exterior and interior of a residential home, in an actual environment. The system provides a background display of digital images, originating from either an image capture device or from other sources, to which changes are to be made for visualization purposes.

Under the '670 patent, the image capture device may be any digital camera, video camera, scanner, or the like. Consequently, the image capture device would not be coordinated with the remainder of the system and could be selected from any manufacturer and model. The system further provides a product catalog in the form of a database of objects, together with features in the computer system operable to record and store digital images of the objects as well as detailed information related to the objects within the database. Again, these elements are not coordinated with one another. The computer system provides a means to access the information related to the objects through a display interface, and in the preferred embodiment in the form of a Windows-pull down interface or in the form of a moveable mouse-click function. The system further provides means for copying and moving an object selected from the catalog and such means is operable to removably place the object over the background to permit what is termed as realistic visualization of the object on the background. The realistic visualization is facilitated by means of a number of tools associated with the system that permit resizing of objects, fitting objects into user designated areas, perspective orientation, and other tools.

It is said that, by employing the invention of the '670 patent, a user can visualize how various actual products would look when applied to a fixed digital photographic image of the interior or exterior of a real home or other building. A user can access numerous images of interior and exterior home products from actual manufacturers, as well as landscaping and horticultural products, in an interactive CD-ROM database. Furthermore, a user can select a specific area of the fixed background image of an interior or exterior of a home or other building and to visualize changes to only that specific area by dragging or otherwise placing image objects of products in the CD-ROM database over that specific area chosen.

The system further allows a user to arrange, rotate, position, resize, orient and otherwise manipulate the product image objects that are placed on the fixed background image to create what is termed a realistic composite image. Also, a user can manually resize a selected image object so that it will fit exactly into a selected rectangular area, or alternatively, so that it will fit proportionally into a selected rectangular area and such a feature permits the system user to resize the rectangular image or an irregular shaped image. Even further still, the '670 patent indicates that a user can make the composite image more realistic by adding shadowing, making the image look more or less sunny, "night lighting" and changing the scenery behind the main object in the composite image. Notably, however, it appears that the '670 patent fails to address fully the realities of different types of lighting. The '670 system also is deficient in that it fails to allow automatic scaling such that it will yield out-of-scale placement of objects in a given environment. This is certainly disadvantageous when one is seeking a realistic prediction of the future appearance of a room, structure, space, or the like. For example, the '670 system will generate products that do not match the renderings produced. With this, a couch that can be manipulated to be part of a given image will in all likelihood not be in a realistic scale such that it may not in reality fit in a given room or space.

In a similar vein, U.S. Pat. No. 5,751,829 provides a method and device designed to enable a user to make a choice from patterns and decorative materials using what is said to be accurate, high-resolution spectral information to ensure that chosen colors match. Also, the '829 device enables an automatic display of commercially-available paints that match the spectral characteristics of the chosen pattern. The invention also renders chosen patterns and paint colors to be accurately rendered onto actual room images. Wallpaper patterns, drapery material, floor covering, or paint can then be selected on the basis of matching color. With this, various patterns and paints can be compared side by side on a high-resolution computer monitor calibrated to produce an accurate color image. Finally, the chosen paints and other decorating materials can be rendered onto a room image so that the consumer can view an accurate simulation of the chosen materials.

The '829 patent makes note that modern computer systems are capable of displaying images in high resolution and in full color on an appropriate monitor. However, the patent further notes that most of such computer imaging has not been overly concerned with color fidelity such that the displayed image can be useless for its intended purpose. The fact of the matter is that errors in the displayed image color have several potential causes. Either the display device or the image procuring device may be incorrectly calibrated to portray color accurately. Additionally, color imperfections can be caused by the inherent limitations of either the image procuring device or the display device. Finally, types and sources of light in the original environment and the new image have been totally ignored.

Prior to the present invention, there has been no totally integrated, specially calibrated system for capturing, transferring, and displaying color accurately from original sources to end use involving memory and special applications. As the knowledgeable observer will be aware, one of the greatest breakthroughs in the history of art took place during the Renaissance, and that breakthrough caused a sensation. It was the discovery that light, particularly its source and intensity, changed everything in a painting. This is evidenced most clearly in the Mona Lisa by Da Vinci. With this in mind, one will appreciate that no displayed image, whether it be painted or displayed on a monitor, can be considered truly accurate without the proper use and appreciation for light.

As was alluded to above, it should be possible to reproduce any color by measuring the intensity of light representative of the color at three discrete wavelengths. However, the reproduction of a color rarely exactly follows theory. First, measurement devices typically are unable to measure light exactly at a number of precise wavelengths. These errors in light measurement inevitably lead to errors in color reproduction. Second, the light sources used for color reproduction (in these cases, phosphors) rarely precisely match the measured wavelengths. This introduces additional color errors into the reproduction process. Third, surface characteristics such as shine or texture often influence the apparent color of an object. These factors do not affect spectrophotometric measurements in the same way that they affect human color perception. Consequently, measured color and reproduced color may differ from perceived color.

Although the abovedescribed developments have undeniably cooperated usefully to establish the present state of the art, there remain a number of deficiencies in the art that leave a cognizable need for further development. As the foregoing discussion makes clear, light is a complex phenomenon, and the computer display systems of the prior art have struggled to display color in an accurate and consistent manner. Consequently, although many prior art disclosures allow a user to perceive on a display screen the general appearance of proposed modifications to an interior or exterior of a building structure, these displays are deficient. The displays can provide a prediction of the shape and size of proposed building modifications. The displays can even provide a prediction of the approximate color of proposed changes.

Among the aspects that prior art has failed to account for properly is the complexity of light. Prior art systems may well display the general appearance of a room or building with proposed modifications to its interior or exterior. They may even be able to attempt to depict the room or building under varied lighting conditions, such as dark, dim, or well lit. However, these prior art systems have heretofore not been able to demonstrate the effects of light in its true complexity. Prior art systems have merely displayed a room or building in lit or non-lit situations. For this and further reasons, accurate appearance and color rendition have been compromised. In this way, many display systems of the prior art can be likened to much of the painted art prior to the discovery and proper depiction of the effects of light sources and types that began to take place during the Renaissance.

The astute observer will appreciate that, in real life situations, the appearance of a room, both in color and overall appearance is significantly affected, not only by whether additional light is provided, but also by the type of light and the source of the light. As was suggested above, incandescent light will produce a markedly different color appearance than will fluorescent light, just as actual sunlight will produce still another color appearance. Even further, the direction from which light is projected onto a surface, room, or building will significantly affect the rendering of the surface, room, building, or object both in color and overall appearance. With this in mind, the present inventors have uniquely appreciated as it relates to computer or television display systems that, by way of example, incandescent light coming from an overhead light fixture will bathe a room in a far different lighted appearance than will actual sunlight passing into the room through a window.

SUMMARY OF THE INVENTION

It is with these things in mind that the present invention was conceived. Under the present invention, a universal, ultra-high definition rendering, advising, and coordinating system for displaying colors, objects, and light enables an accurate rendering of a color, room, building, object or landscape. The invention is founded on three fundamental goals: 1) to enhance customer satisfaction, the single most important function of marketing today; 2) to accomplish that by providing a real gateway to a true custom economy through a convenient, easy to use, low cost new reliable way to preview how contemplated purchases or changes in environments will integrate into the broader spectrum of personal or business life before they are actually consummated; 3) to add value, by virtue of increased customer satisfaction, to every object, product, person or endeavor that utilizes the advantages of the invention.

Stated most briefly, the invention provides for a coordinated system of an image procuring device, a memory device, a processor, and a display device that together allow a user to predict the appearance of the interior or exterior of a building, home, landscape, or object with true accuracy, which heretofore has been unrealized by the prior art. In achieving this true accuracy, the rendering system is calibrated to display colors, rooms, buildings, landscape, objects, and proposed changes thereto accurately not only with regard to size and shape but also with regard to color and light, both in type and direction. Consequently, with appropriate programming, user-selected optimal color and lighting can be custom coordinated and superimposed on a given environment to maximize the value and enjoyment of any environment or product in any environment where color and light play important roles.

To accomplish this, as was alluded to above, the rendering system is founded on an image procuring device, a memory device, a processor, and a display device. By means that will be obvious to one skilled in the art after reading this disclosure, the image procuring device, the memory device, the processor, and the display device are all specially calibrated and coordinated to ensure that the color viewed and procured in situ by the image procuring device will be identically displayed on the display device. Furthermore, a virtually infinite range of colors are retained by the memory device in a precisely replicable and displayable format that can be superimposed on any procured image so as to accurately render how any color will appear on a procured image if adopted by the consumer. Advantageously, the colors are categorized and coordinated to compliment whatever goal a designer might have in mind.

One will appreciate that the foregoing discussion broadly outlines the more important features of the invention to enable a better understanding of the detailed description that follows and to instill a better appreciation of the inventor's contribution to the art. Before any embodiment of the invention is explained in detail, it must be made clear that the following details of construction, descriptions of geometry, and illustrations of inventive concepts are mere examples of the many possible manifestations and uses of the invention.

DETAILED DESCRIPTION OF PREFERRED EMBODIMENTS

As with many inventions, the present invention for a universal, ultra-high definition color, light, and object rendering, advising, and coordinating system and method can assume a wide variety of embodiments. However, to assist those reviewing the present disclosure in understanding and, in appropriate circumstances, practicing the present invention, certain particularly preferred embodiments of the method and system will be described hereinafter.

Figure 1:
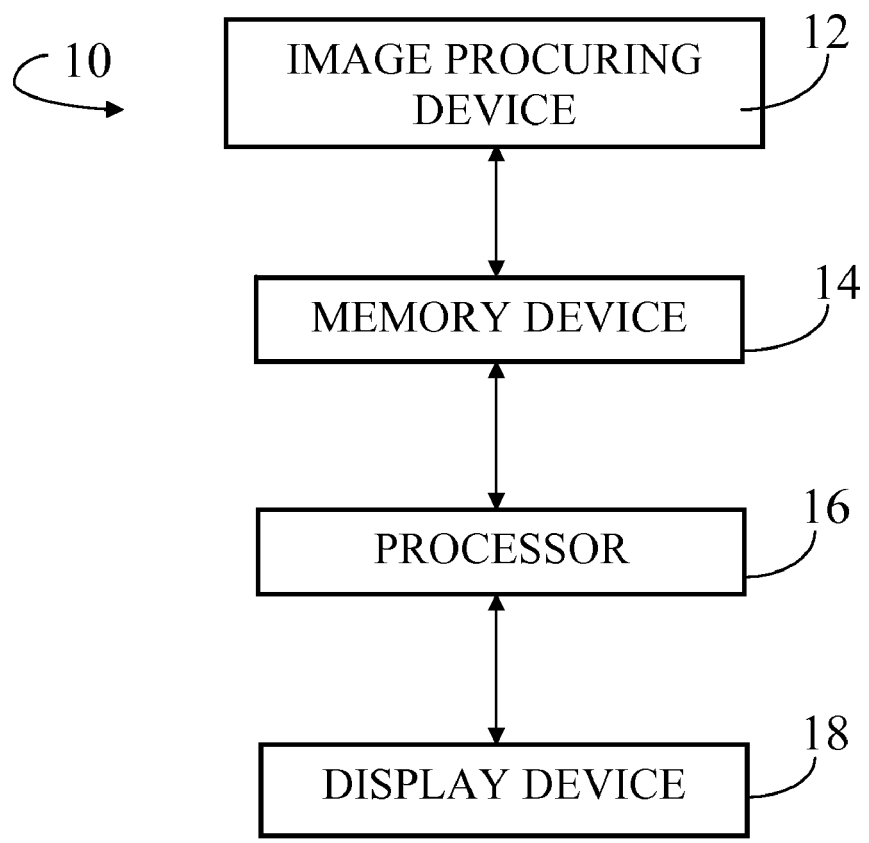
FIG. 1 is a schematic depiction of the basic elements of an embodiment of the present invention for a universal, ultra-high definition, and accurate color, light, and object rendering, advising, and coordinating system.

Looking more particularly to the drawings, a most basic embodiment of the present invention for a universal, ultra-high definition color, light, and object rendering, advising, and coordinating system is indicated generally at 10 in FIG. 1. There, one sees that the system 10 is founded on four basic components. The first is an image procuring device 12, which as its name would suggest is employed to procure images. The image procuring device 12 is operably associated with a memory device 14 such that images procured by the image procuring device 12 can be delivered to and stored by the memory device 14. Furthermore, the memory device 14 and the image procuring device 12 are both operably associated with a processor 16, the function of which will be described more fully hereinbelow. Finally, the memory device 14, the image procuring device 12 and the processor 16 are in turn operably associated with a display device 18 for displaying procured and other images as will be discussed below.

Figure 2:
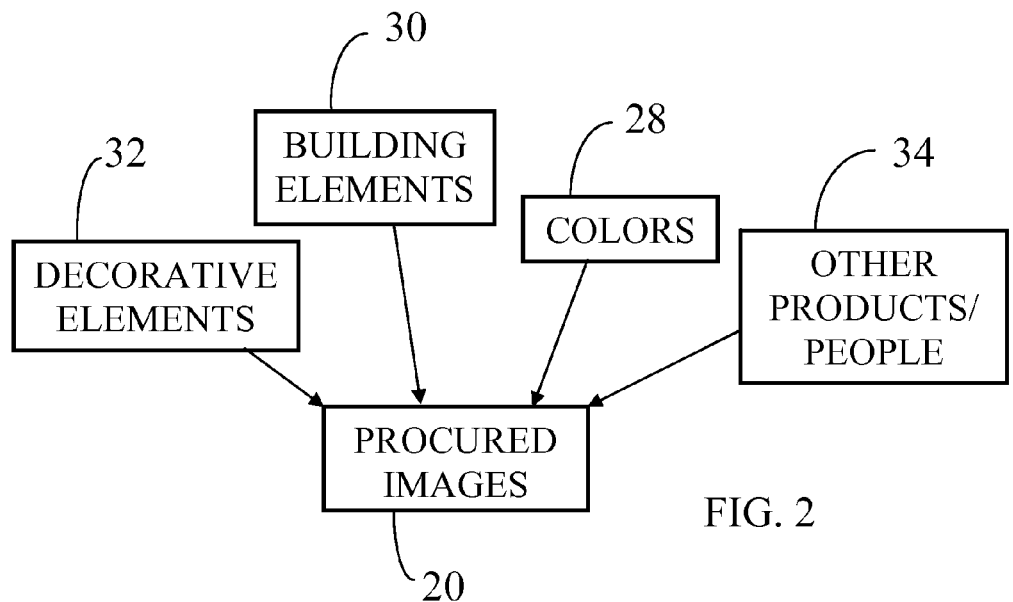
FIG. 2 is a schematic depiction of elements that can cooperate to form procured images.

The image procuring device 12 certainly could take a variety of forms. For example, the image procuring device 12 could comprise a specially calibrated digital or film camera. The image procuring device 12 could be a specially calibrated, high-definition still digital camera, also indicated at 12 in FIG. 1. As FIG. 2 shows, the image procuring device 12 could procure and thereby provide still images of colors 28, building elements 30, decorative elements 32 or any other object or product 34 whose image a user might wish to procure. Where a film camera is employed as the image procuring device 12, customized film processing procedures would preferably be employed to yield exact matches between actual procured colors 28 and those depicted on the resulting film.

As one will appreciate, procured colors 28 would in reality be infinitely variable such that the advantages deriving from the ability of the present invention to reproduce procured colors 28 identically becomes particularly apparent. Information regarding procured building or other elements 30, which necessarily would incorporate colors 28, could include building exteriors, interiors, and components, landscapes, and many other elements or products. Procured decorative elements 32 also could include numerous structures including plants, trees, moldings, trim, furniture, rugs, paintings, sculptures, and many other elements. Advantageously, the procured images 20 also would incorporate information regarding lighting including lighting type, intensity, and directional source.

Although a still camera 12 certainly could act as a useful image procuring device 12, even greater advantage could possibly be obtained by use of a specially calibrated motion or 3D camera 12, preferably high-definition digital, which could provide moving images of each of the abovedescribed colors 28, building elements, 30, decorative elements 32, and other elements, products, or persons 34. Of course, all procured images 20 will be displayed and procured in their actual lighting situations. With this, the motion digital camera 12 could procure moving images as the camera 12 is moved about the exterior of a building or as the camera 12 is moved through a room or a series of rooms or landscapes or around pertinent objects or products.

The image procuring device 12 preferably will incorporate its own memory medium, which would be particularly accessible where the image procuring device 12 is a digital camera 12. Once retained in the memory medium of the image procuring device 12, procured images 20 advantageously can be dealt with in a plurality of ways. For example, the procured images could be archived by being transferred for storage on a more permanent basis on the memory device 14, which can comprise a hard drive of a computer or a high-density, high-definition CD-ROM, DVD, or an advancement thereover as will be discussed more fully below.

Alternatively, the procured images, especially those being coordinated and calibrated, 20 could be transmitted from system 10 to system 10 by any one of a plurality of means including email, cellular telephone transmission, palmheld computer, or any other means for transmitting procured images 20 that may now exist or hereafter be developed. The procured images 20 in any event will at some point be displayed on a display device 18 as also will be discussed more fully hereinbelow. Where a film camera is employed as the image procuring device 12, the procured images 20 would generally be dealt with by custom film developing calibrated to display images that are essentially identical in all respects to the actual procured images 20.

It will again be noted that the specially calibrated and coordinated memory device 14 could pursue a wide variety of forms. For example, the memory device 14 could comprise a computer memory, such as a hard drive, or the like. Advantageously, the memory device 14 could receive and retain coordinated digitally procured images 20 of the room, color, building, landscape, product, or other image be the images 20 still or moving. Ideally, of course, the memory device 14 will have the substantial capacity required for accurately retaining a large plurality of procured images 20 and reference images 22 as will be discussed below. As one skilled in the art will be well aware, any attempted specification of the particular capacity of the memory device 14 would be quickly outdated by the rapidly progressing capabilities of computers and computer technology. Therefore, it shall suffice to say that the preferred memory device 14 will have as substantial a capacity as is commercially practicable.

The specially calibrated and coordinated processor 16 also could be of a number of types. Of course, the processor 16 would likely comprise a computer processor 16. The preferred processor 16 naturally should be of sufficient speed and ability to process and manipulate the procured and reference images 20 and 22 as necessary to accomplish the tasks that will be elaborated upon below. Again, in light of the rapid advancement of computer technology, the specification of a particular processor speed would be substantially futile. Therefore, it is sufficient to note only that the processor 16 should have as high a processing speed as state of the art technology permits.

The specially calibrated and coordinated display device 18 also could be of a number of types. However, it is an important aspect of the invention that the preferred display device 18 be of ultra-high resolution such that the procured images 20 and reference images 22 retained in the memory device 14 can be processed by the processor 16 and displayed by the display device 18 accurately and with exceptionally high resolution. For example, the presently preferred display device 18 comprises a large, ultra-high definition display screen. What may be considered a most preferred display device 18 comprises a 40-60 inch ultra high definition display screen.

Figure 3:
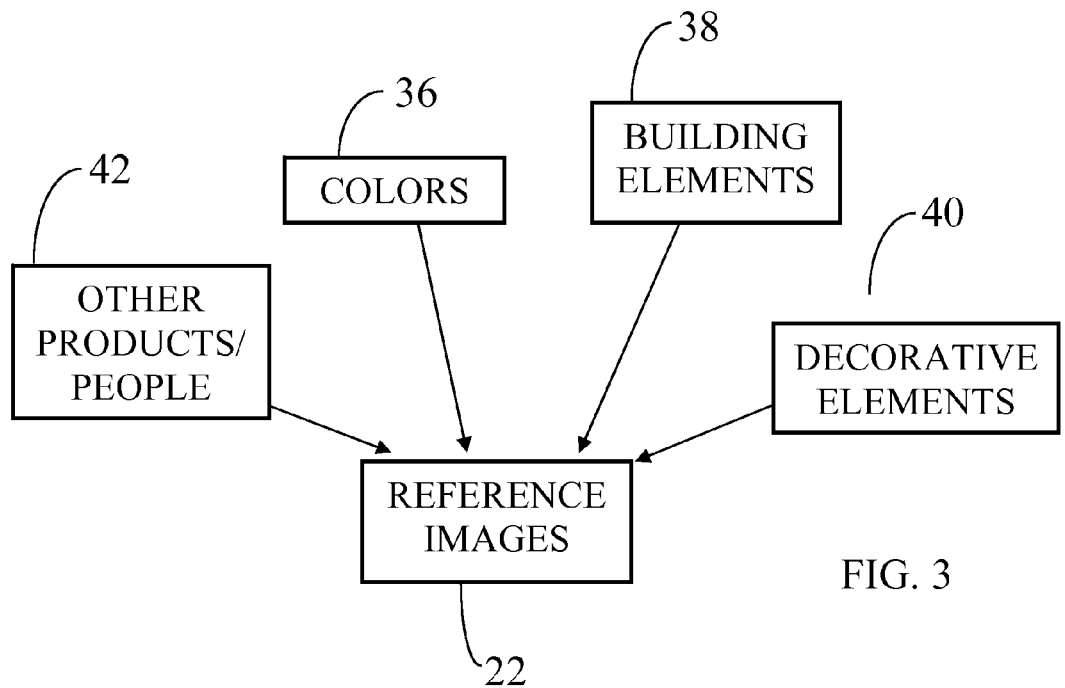
FIG. 3 is a schematic depiction of elements that can cooperate to form reference images.

As suggested above, the preferred embodiment of the system 10 will further retain in the memory device 14 a variety of reference images 22 that is as extensive as possible. As FIG. 3 shows, the reference images 22 preferably will include a virtually endless variety of colors 36, a wide variety of building elements and designs 38, a wide variety of decorative elements 40, and a plurality of other relevant consumer or industrial products or persons 42. Because the system 10 is entirely coordinated, the colors 36 will be displayed on the display device 18 with an accuracy and consistency that has been previously unattainable.

Figure 4:
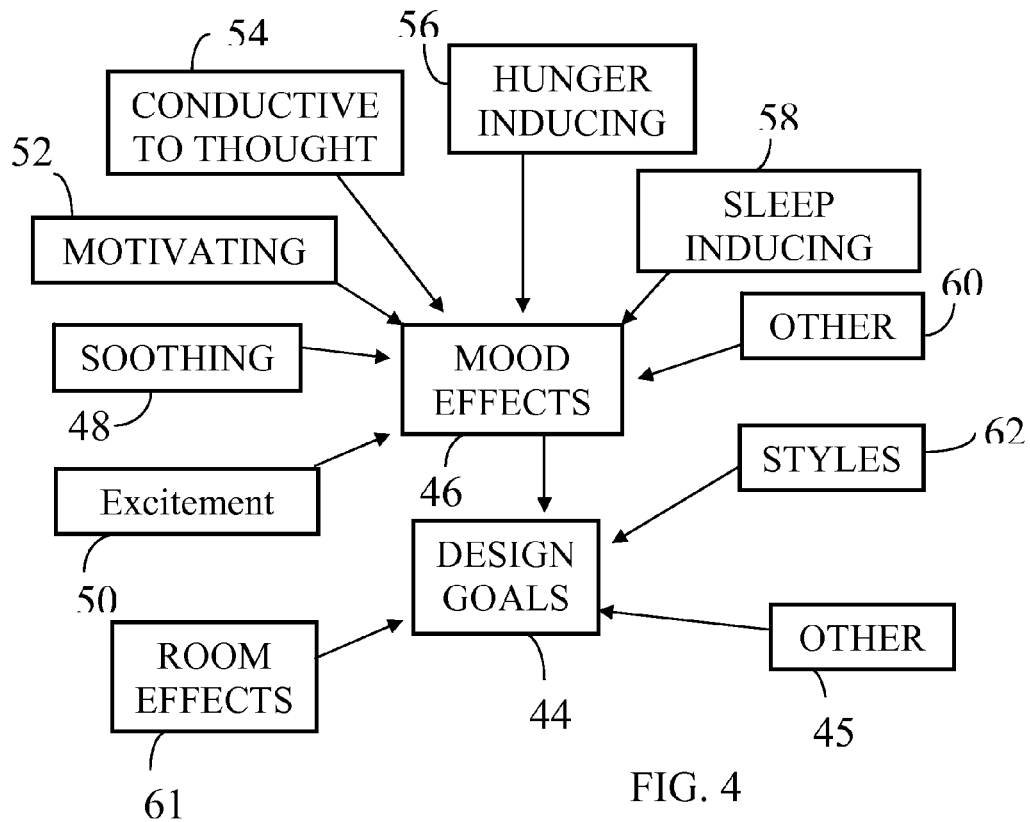
FIG. 4 is a schematic depiction of potential design goals that can be accommodated by the system.

Furthermore, the colors 36, building elements 38, decorative elements 40, and other products 42 preferably will be coordinated to enable the processor 16 to draw from the reference images 22 to accomplish a user's selected design goals 44 as is shown in FIG. 4. Those design goals 44 can include, for example, including providing coordinated and complementary colors 36 that accomplish selected mood goals or effects 46 such as being soothing or relaxing 48, exciting 50, motivating 52, conducive to thought 54, hunger inducing 56, sleep inducing 58, or any other possible response 60 to color 36 or other design element. Still further, the system 10 could additionally and automatically incorporate alternative design principles as room effects 61 such as the ancient Chinese concepts of Feng Shui. Also, the system can accommodate style goals 62 including furniture styles, decorating styles, interior and exterior design styles, trim styles, flooring styles, ceiling styles, clothing styles, makeup styles, and still other styles. One will appreciate that utilizing these features could be invaluable to an owner when designing a new home, office, or other space and in renovating, enlarging, remodeling, redecorating, or otherwise altering an existing space.

Figure 5:
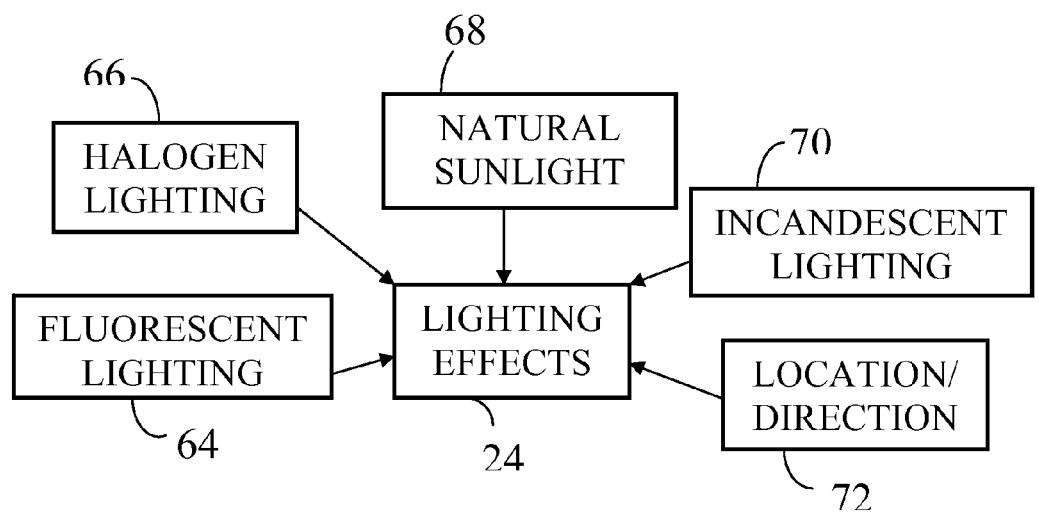
FIG. 5 is a schematic depiction of potential lighting effects that can be depicted by the system.
Figure 6:
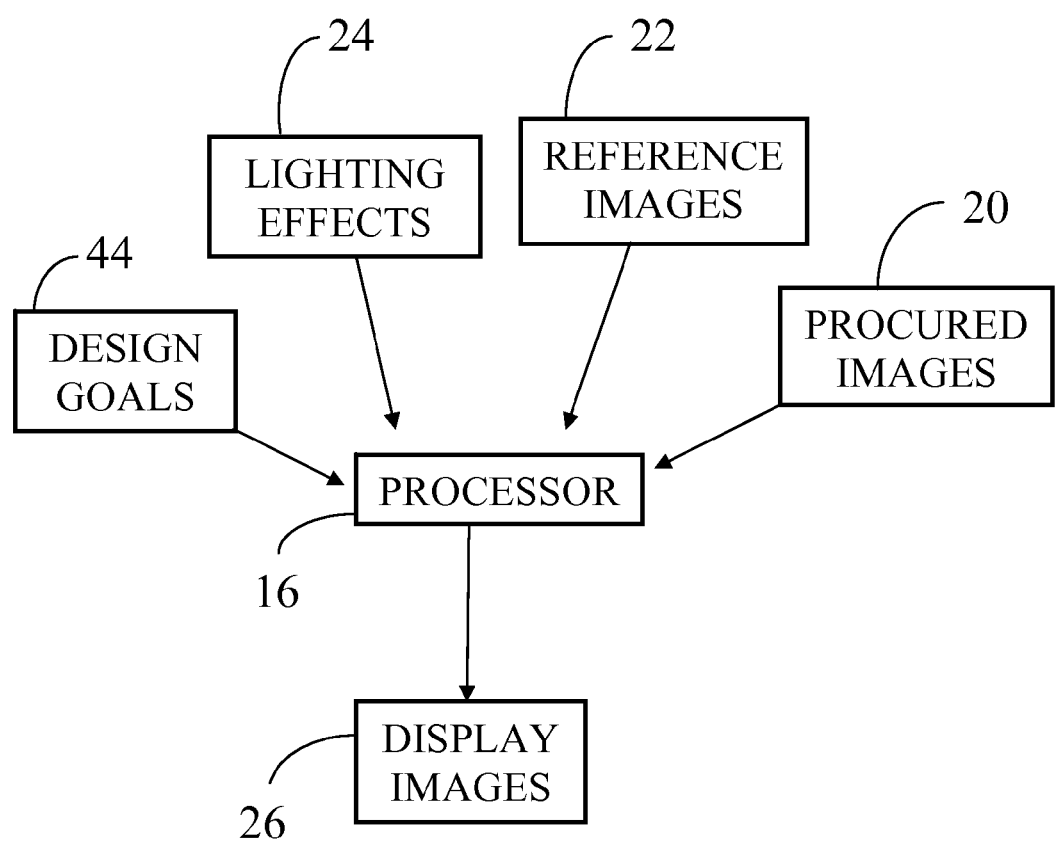
FIG. 6 is a schematic depiction of the components that the system can incorporate to produce display images.

In a still more unique aspect of the invention, which is best seen in FIG. 5, the rendering system 10 could further include a means for providing simulated lighting effects 24 in and on the display device 18 to bathe a room, building, home, landscape, product, person, or any other procured or reference image 20 or 22 in various sources of light. Ideally, the means for providing simulated lighting effects 24 provides a means for controlling the type 64, 66, 68, and 70 of lighting effect 24 and also the direction and orientation 72 of the simulated light sources. As one will appreciate from the discussion of the prior art set forth above, this comprises a marked advance over the prior art, which has failed to provide an accurate simulation of light with regard both to type and source location. This can be critically important since, without it, the actual appearance of a given color in an actual environment or on a product or object would be impossible to predict because, as mentioned above, different light types and directions can dramatically change how a given color appears.

Advantageously, looking again to FIG. 5, one sees that the lighting effects 24 aspect of the invention allow a user to choose the type of lighting to apply to the procured images 20 and the reference images 22 and to choose the proper source for that lighting. Stated more particularly, a user can choose whether to provide simulated incandescent light 70, fluorescent light 64, halogen light 66, full spectrum natural sunlight 68, or, as is often the case in daytime, a mixed light situation. Also, the user can adjust the relative intensity of one or all types of selected light 64, 66, 68, and 70. Furthermore, the user can choose from where the selected light 64, 66, 68, and 70 should emanate to coordinate and optimize satisfaction with the user's depicted environment in a most flexible manner to depict both day and night situations. For example, the user can choose to have natural sunlight 68 enter through a window. Alternatively or additionally, the user can choose to display incandescent or halogen light 70 or 66 as emanating from a lamp in a room or from a shielded structure.

Figure 7:
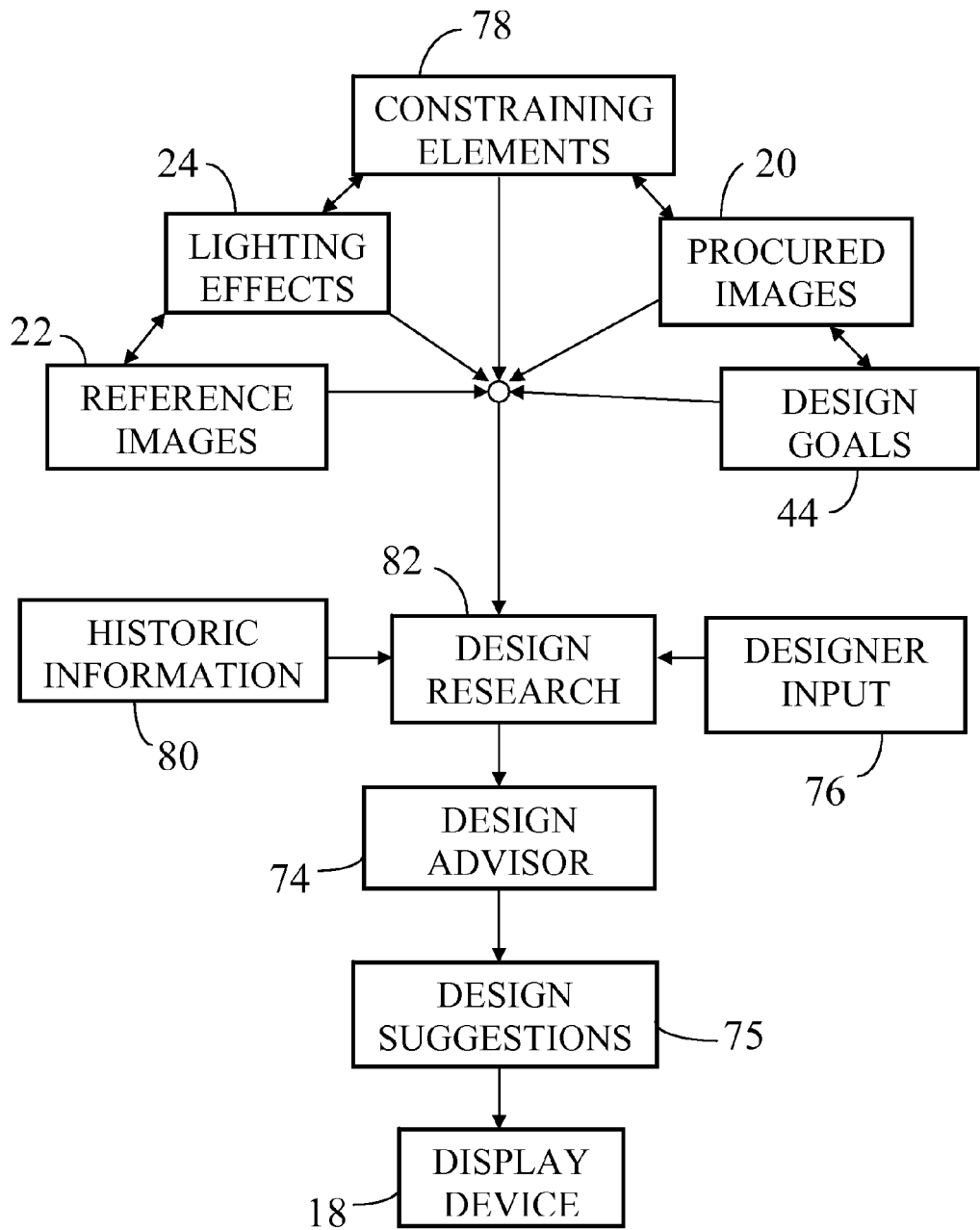
FIG. 7 is a schematic depiction of the interrelationship between elements that cooperate to produce design suggestions according to the present invention.

Even further still, one will bear in mind that people usually know what they find aesthetically attractive. However, many people find it difficult to originate color and decorating schemes on their own. Advantageously, in particularly preferred embodiments as is shown in FIG. 7, the present invention can further incorporate a means, which may be termed a design advisor or color coordinator 74 for making option suggestions 75, for making suggestions or providing from one to many optimal complementary choices as to colors 36, decorative elements 40, such as furniture, and building elements 38, such as structural design selections and layouts including the placement and orientation of objects, lighting effects 24 such as source type 64, 66, 68, or 70 and locations or orientations 72, and any one of a plurality of further interior and exterior design considerations. Such a design advisor and/or color coordinator 74 enables overall environmental integration and optimization even for those users with little or no experience or natural ability in interior and exterior design.

With such a design advisor and/or color coordinator 74 provided, a user could select certain constraining elements 78, if there are any, and the design advisor 74 could provide design suggestions 75 as to what colors 28 or 36 and other elements would work well in combination with that or those constraining elements 78 depending on individual goals. One common constraining element 78 on the exterior of a structure is roofing. For instance, if a structure has a black roof or a brown roof, there are only certain colors 28 or 36 that will attractively blend with or compliment the rest of the exterior of the building. I In a further example, a user could input a particular base color, such as maroon brick, 28 or 36 as a procured image 20 or reference image 22 for the walls of a room or building, and the system 10 by means of the design advisor 74 could select from and provide suggestions and displays regarding reference images 22 including colors 36, building elements and surface materials 38, and decorative elements 40; lighting effects 24 including lighting type 64, 66, 68, and 70 and lighting location and direction 72; design goals 44 including mood effects 46 and actual furniture styles and pieces 62; and procured images 20 including decorative elements 40 such as trim that would complement the user's constraining element or elements 78 and, for example, any design goals 44.

One will appreciate that constraining elements 78 and other elements to comprise elements of display images 26 for display on the display device 18 could be input in a number of ways. As such, the term input should be considered to include any appropriate means for communicating a constraining element 78 or other element to the system 10. For example, the constraining elements 78 and other elements could be selected from reference images 22, lighting effects 24, design goals 44, and additionally or alternatively procured images 20. Although reference images 22 could derive from a still or motion digital camera 12, they also could be scanned in using a mutually calibrated and ultra high definition coordinated scanner that would thus comprise an image procuring device 12. With this, a user could scan in any selected image including photographic images from non-digital cameras, magazine images, and substantially any other image source. Of course, the procured image 20 preferably will be accurate and identifiably scaled. The procured image 20 thereby could be uploaded into the memory device 14 of the system 10.

In furtherance of its provision of a design advisor 74, the system 10 retains a virtual understanding of the interrelation between colors 28 and 36, lighting effects 24, building elements and elements 30 and 38, decorative elements 32 and 40, and other decoration and design considerations and products 34 and 42. Naturally, this virtual understanding will be programmed into and stored in an archive within the present system 10 such as in the memory device 14.

A first means by which the system 10 provides the design advisor 74 is by the incorporation of an element denominated in FIG. 7 as designer input 76. With the designer input 76, the system 10 effectively incorporates the knowledge and taste of persons with exceptional knowledge, experience, and inherent ability in design and style. As one will appreciate in light of this disclosure and as will be made still clearer below, the system 10 can incorporate that expert knowledge and taste in any area where doing so would be valuable. With this, the system 10 can be employed in the design and alteration of substantially any structure or product. In doing so, the system 10 takes advantage of the knowledge and ability of persons that can be considered decoration and design geniuses since they may reasonably be considered markedly superior in their ability to select and coordinate color 28 and 36 and building and decorative elements 30, 38 and 32, 40.

The design suggestions 75 provided by the design advisor 74 also take into account design research 82 to supplement the designer input 76. The design research 82 includes information as to how color 28 and 36 and building and decorative elements 30, 38 and 32, 40 affect a person's mood, productivity, and other characteristics. As one will appreciate and as FIG. 7 shows, the design research 82 necessarily interrelates with a plurality of other elements of the system 10, particularly the design goals 44, reference and procured images 22 and 20, and the lighting effects 24.

Still further, as FIG. 7 also shows, the designer input 76 and the design research 82 are supplemented by historic information 80 regarding prior art rooms, architectural masterpieces, and other structures that have been found to be aesthetically pleasing or functional. When used to produce design suggestions 75 for display on the display device, the historic information 80 allows a user to view prior art structures and designs to see what others have done previously that worked well aesthetically, functionally, or both. In this respect, the historic information 80 provided by the system 10 represents an analogous but markedly improved practice in comparison to what has been done by many previously. Stated alternatively, the historic information 80 allows a user to accomplish immediately and conveniently what others have done by poring over countless magazines, touring model homes, and otherwise attempting to gain historic information as to what has been effectively done by others.

With this, the designer input 76, the design research 82, and the historic information 80 cooperate to accommodate the reference images 22, the lighting effects 24, the constraining elements 78, the procured images 20, and the design goals 44, which are necessarily interrelated, to enable the system 10 to provide design suggestions 75 in a plurality of respects. It will be apparent then that the resulting display images 26 shown on the display device 18 can then be the composite result of procured images 20, reference images 22, lighting effects 24, design goals 44, and constraining elements 78.

The system 10 could incorporate an amalgamation of examples and practices in substantially any discipline including interior decoration for providing design suggestions 75 regarding how to achieve desired room effects 61 (FIG. 4) for affecting an observer's overall perception of the room or structure such that a small room could be perceived as being larger, a large room could be perceived as being smaller, a low-ceilinged room could be perceived as being taller, or any other of a variety of interior room effects 61 or design goals 44 could be achieved. Most advantageously, the system 10 enables a user to view numerous different potential design arrangements or suggestions 75 nearly instantaneously on the display device 18 until a particularly desirable arrangement is found. Once found, even that most preferable arrangement could be manipulated by the user and the system 10 to allow even further personal satisfaction of the user's goals and desires.

As a result, a typical user will effectively become superior even to a design genius in that he or she will have at his or her disposal the knowledge of multiple design geniuses as designer input 76 along with the benefits of volumes of design research 82 and experimentation and historic information 80. Still further, with the ability of the system 10 to provide numerous design suggestions 75 substantially instantaneously, a user will be able to sort through and narrow down from nearly an endless plurality of design possibilities and permutations to find that design suggestion 75 or modification thereof that is optimal to the particular beholder. As a result, numerous design experiments can effectively be made and plural concepts can be tested with little or no cost to the user.

Where the system 10 is to display numerous display images 22 of potential modifications, additions, new constructions, and/or the like, the system 10 may advantageously provide a means for sequentially displaying display images 22 and for progressively selecting preferred display images 22 from those display images 22 for continued or repeated display by the system 10. To do so, the user could indicate, as by clicking on a computer mouse, which display image or images 22 is more preferred or which display image or images 22 is less preferred. Under such an arrangement, the user can view progressively eliminate display images 22 until only a preferred display image or preferred display images 22 remain.

Of course, this could be carried out in a number of ways that would each be well within the scope of the present invention. For example, the system 10 can be programmed to display each of a plurality of display images 22 for a specified amount of display time, such as 3 seconds, through a first round. During that display time, the user can indicate which image or images 22 is or are preferred. Through a second round, only those preferred display images 22 will be displayed. Having survived the first round, those display images 22 can be displayed for a longer display time, such as 10 seconds, over the second round during which one or more display images 22 can be selected as being preferred from among those initially preferred display images 22. This process can continue progressively until just one or a given number of most preferred display images 22 remain.

One will also appreciate that, by combining procured images 20 with reference images 22, a user can insert particular products into the display image 26 of his or her own living room, office, or other space or structure whose image has been procured by the image procuring device 12. For example, the user could preview the appearance of an Oriental rug, a sofa, a lamp, painting, or any other reference image 22 he or she may desire to see incorporated into his or her environment, such as a priceless antique.

The system 10 could then provide design suggestions that coordinate with that structure or object to provide an ideal or preferred interior or exterior design. A user could also input a whole roomful of furniture and accessories as a procured image 20 and let the machine automatically arrange and instantly rearrange the procured image 20 as many times as desired while the system 10 improves the design according to the most brilliant interior decoration standards deriving from designer input 76, design research 82, and historic information 80s.

Alternatively, it will also be clear that the system 10 could begin designing based on a bare room or space, which could be a procured image 20 or a reference image 22. Then, the user could choose a design goal 44, such as, for example, a furniture style 62. Exemplary furniture styles include Modern, Mediterranean, Oriental, Traditional, Colonial, Antique, and a plurality of other possible furniture styles 62. Furthermore, the user could input any particular budget limitations as a constraining element 78 that must be accommodated. Still further, the user could opt for additional design goals 44 for the room or space such as mood effects 46 to yield a relaxing study or a productive workspace. In each case, the system 10 could present myriad display images 26 with nearly endless variations in colors 28 and 36, lighting effects 24, structures, configurations, and arrangements upon command by the user.

The preferred processor 16 additionally incorporates a means for automatically processing and portraying display images 26 in an identical scale accurately and consistently. With this, the system 10 allows for a selected manipulation of lighting and for automatic true-scale adjustments. One skilled in the art will appreciate that this comprises a marked advance over the prior art that often merely displayed design elements without regard for their particular scale. With this, all display images 26 will be of an identical scale so that, for example, the realistic preview of a designed or modified room and the object to be introduced into or displayed in that room or other structure is further ensured.

Furthermore, the system 10 can allow a room, home, building, or other space to be modified, including by providing additions thereto. Of course, such spaces could be modified in numerous ways. For example, rooms can be added as can be hallways, closets, greenhouses, and still other structures. Still further, walls can be moved in, pushed back, and changed in shape. Likewise, ceilings can be raised, lowered, and altered. Most advantageously, these proposed changes can be carried out at little cost to the user since they are carried out only in simulation.

For example, with the present invention, a selected couch will automatically be placed in an identical scale to that of a selected or input table, painting, or other design element. With no unrealistic changes in size, the system 10 will enjoy still further realism over prior art display devices and systems. Even further, the system 10 facilitates movement of objects within the display images 26 in different orientations and locations around a room or space while automatically maintaining perfect size perspective relative to the room or space.

Figure 8:
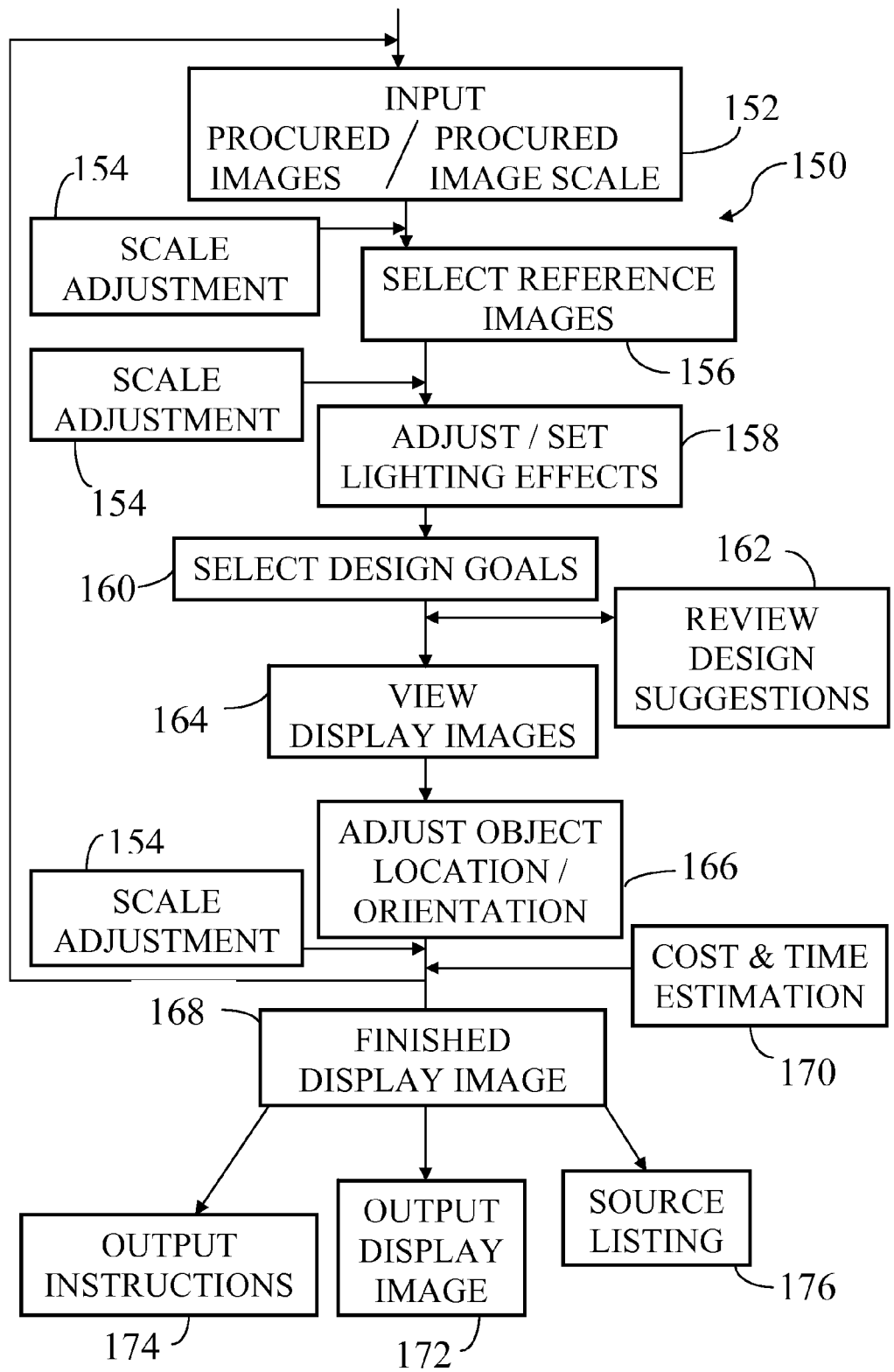
FIG. 8 is a schematic depiction of an exemplary process according to the present invention for producing a finished display image.
Figure 9:
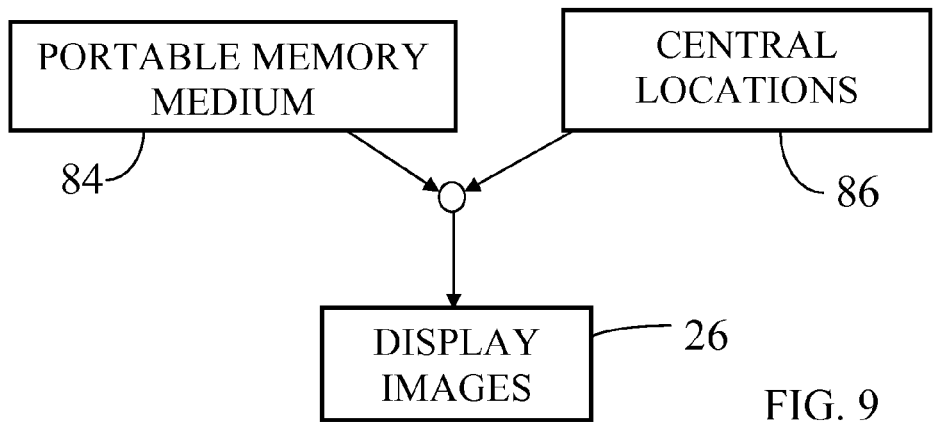
FIG. 9 is a schematic depiction of an embodiment of the invention wherein a user can employ a portable memory medium to cooperate with elements of the system that are retained by a central location to produce display images.

With the foregoing system 10 provided, the astute observer certainly would find a number of processes for practicing the present invention readily obvious. However, to ensure that the present disclosure is complete, reference may be had to FIG. 8 where an exemplary process under which one could take advantage of an embodiment of the present invention to design an ideal display image 26 is indicated generally at 150. It should be clear, however, that the image creation process 150 is merely exemplary, and additional and varied steps could be included in processes that nonetheless take advantage of the present invention. Also, not all steps shown and described need be carried out in all cases, and the steps certainly do not need to be practiced in the order set forth in the exemplary image creation process 150.

In any event, the preferred image creation process 150 could begin with step 152 where the user inputs or selects one or more procured images 20 and, if necessary, inputs the scale of each input procured image 20. Then, the system 10 automatically carries out step 154 by adjusting the scale of each procured image 20 to a shared single scale. Next, the user can, if necessary, carry out step 156 by selecting one or more reference images 22, which as one will be well aware could comprise a color 36, a building element 38, a person, a car, a decorative element 40 or any other product 42. The system 10 then automatically carries out step 154 to adjust the scale of the reference images 22 and procured images 20 as necessary to ensure that the images 20 and 22 share an identical scale so that the display image 26 is realistic and accurate.

With the images 20 and 22 so input and scale-adjusted, the user can then adjust and set lighting effects 24 under step 158 by selecting lighting type or types 64, 66, 68, and 70 and by selecting the orientation and location 72 of selected lighting effects 24. Still further, where multiple types of light 64, 66, 68, and 70 are provided, a user can adjust the relative intensities of lighting types 64, 66, 68, and 70 to ensure a still more realistic display image 26. The user can then, if desired, carry out step 160 by selecting one or more design goals 44, such as mood effects 46, furniture styles 62, and room effects 61.

That selection of design goals 44 will induce the processor 16 by means of the design advisor 74 to produce design suggestions 75 by consideration of historic information 80, design research 82, and designer input 76 in light of the procured and reference images 20 and 22, lighting effects 24, any constraining elements 78, and the user's design goals 44. Under steps 162 and 164, the user can then review a plurality of design suggestions 75 until he or she finds one or more display image 26 that can be considered most preferable functionally, aesthetically, or both. With this, the system 10 provides optimal personalization and/or customization.

With this, the user can then undertake step 166 if desired by adjusting the location and orientation of some or all elements of the display image 26. For example, the user can select and move, add, or delete objects or elements relative to the display image 26, the user can adjust displayed colors 28 and 26, the user can alter lighting effects 24 including adding or deleting lighting apparatuses, and the user can adjust design goals 44. As these adjustments are made, the system 10 automatically again carries out step 154 by adjusting the scale of the displayed images 26 to ensure that they are accurate and consistent.

To still greater advantage and still more uniquely, the system 10 can carry out step 170 where it provides an estimate of the cost of the proposed additions, modifications, or other possibilities while also providing, where applicable, an estimate of the time that would be required for carrying out those additions, modifications, and the like. In doing so, the system 10 can estimate material and labor costs as well as, where applicable, possible changes in value of the structure to be built, modified, or otherwise affected. To carry out the step of cost and time estimation 170, the system 10 can be programmed with current costs of materials as well as the estimating expertise of persons have skill in the relevant industry.

With this, the user ultimately will reach step 168 with the creation of one or more finished display images 26. Those finished display images 26 can, for example, act as the foundation for the user's remodeling or building a home. Alternatively or additionally, the finished display images 26 can be used as the basis for purchasing paint, buying furniture or a car, landscaping an outdoor environment. Still further, the finished display images 26 can be used as a guide in adopting a complete personal makeover of one's hairstyle or color, makeup, wardrobe, and clothing.

With a finished display image 26 achieved, the system 10 and process 150 provide the user with a number of options. Of course, the user could simply end the process 150 with the finished display image 26 in mind. Alternatively, the user could induce the system 10 to carry out step 172 where the finished display image 26 is output. This output display image step 172 could be carried out in a number of ways. For example, the finished display image 26 could be printed by a printer that is specially coordinated with the display and the system 10 in general to depict printed ultra high definition images that are identical to the finished display image 26 in color, light, proportion, scale, and further characteristics.

Alternatively or additionally, the user could cause the system 10 to carry out step 174 where the system 10 could output, as by printing or displaying, instructions. The instructions could be in the form of steps as to how to carry out the proposed modification, addition, or creation, they could be or include formulas for creating materials to be used, such as paints, makeup elements, and the like, or they could be listings of the materials that would be required. Still further, the user could induce the system 10 to carry out step 176 where the system 10 provides a listing of potential sources for the proposed modification, addition, or creation. For example, the system 10 could list local merchants, carpenters, makeup artists, mechanics, and other craftspeople. Under one embodiment, these potential sources could be under agreement to engage in their best efforts to meet the cost and time estimates provided by the system 10 under step 170.

Figure 10:
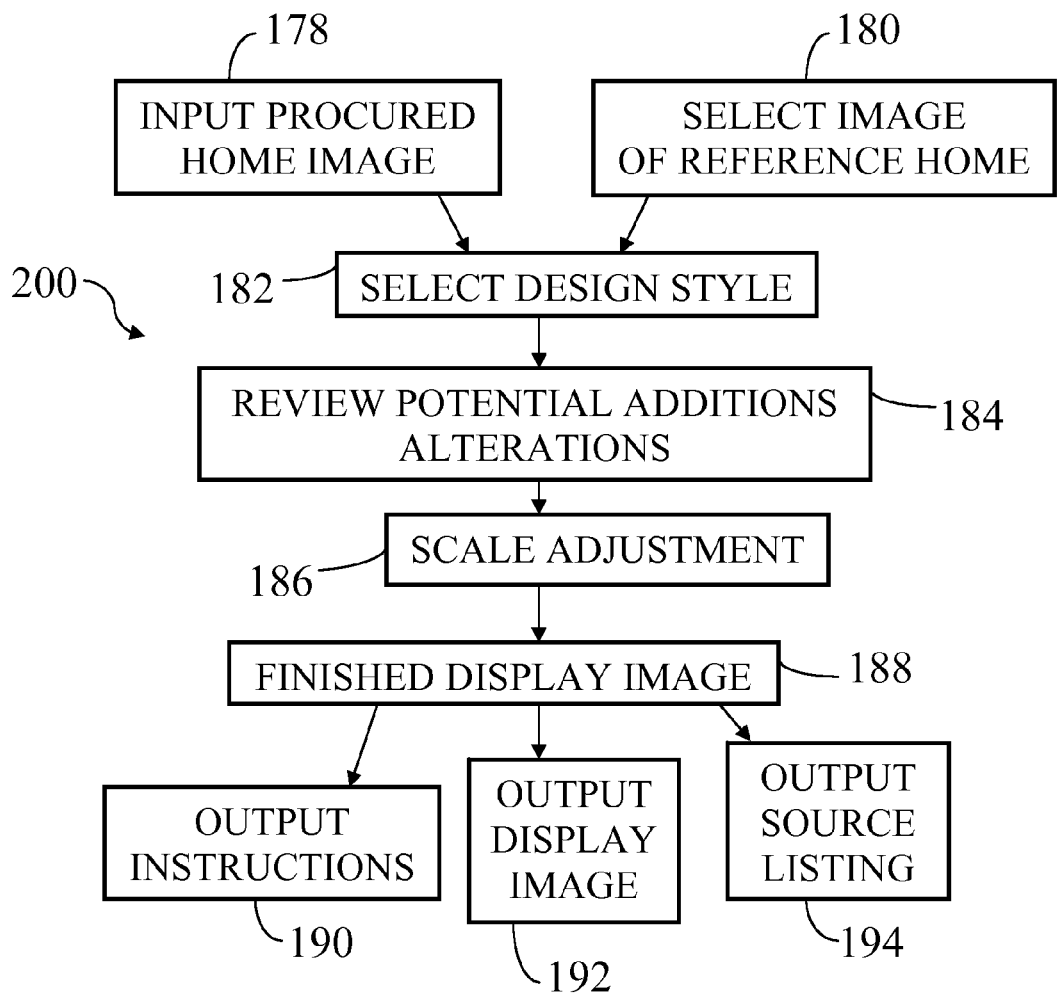
FIG. 10 is a schematic depiction of an exemplary process under the present invention.

FIG. 10 depicts a process 200 that is particularized for the construction, modification, or addition to a home or other building. The process 200 begins with the user either inputting a procured home image under step 178 or selecting an image of a reference home under step 180. The procured home image of step 178 could, for example, be of the user's own home or of a home that he or she might wish to purchase. The reference home selected under step 180 could be chosen by the user after scrolling through many different styles of homes (i.e., hundreds) that are retained by the system. The reference home could be chosen as an approximation of the user's own home or as a home that he or she might wish to build or purchase.

Once the proper style of home is input or selected under step 178 or step 180, the user can select a design style under step 182 whereupon the system 10 will automatically undertake step 184 to propose potential alterations, additions, and the like that have been retained by the system 10 after being input by experts in the field. The user can view these proposed alterations, additions, and the like and then select one or more that may be preferable. Of course, the system 10 again will carry out an automatic adjustment of the scale of the displayed images as in step 186. The process will then yield a finished display image under step 188. Again, the user can then output instructions regarding the image under step 190, output the display image under step 192, and/or output a listing of sources under step 194.

To be complete, one must appreciate that, although primarily described relative to rooms, building structures, landscapes, and similar objects, the present system 10 is not so limited in its applicability. The system 10 is equally applicable to other environmental structures, products, and uses or persons. For example, the system 10 could be used to equal advantage for designing and selecting the characteristics of motor vehicles, such as cars, trucks, and motorcycles. Relative to a car, for example, the system 10 could be used by automotive dealers or manufacturers to display a given model car. With the ultra-high definition display device 18, such as a 40-60 inch monitor, the system 10 could realistically, accurately, and dramatically display the car in any color and with any options that may be selected by the user.

For example, the user could see in an accurate rendering the selected car with any combination of different true-to-life colors, wheels, tires, details, upholstery fabrics, interior details, and other mechanical and cosmetic modifications including body kits, spoilers, aprons, and the like. With this, he or she could enjoy a complete menu of options as reference images 22 and could be assured that the resulting automobile will be satisfactory in appearance and other characteristics. Accordingly, buyers will be more likely to be unequivocally pleased with the delivered vehicle as a product personally customized for them, and sellers will be likely to enjoy increased sales of vehicles and accompanying options, modifications and improvements. One knowledgeable in the art will appreciate that this is particularly advantageous in that society continues to trend toward an evolving custom economy where purchased items are ever more commonly crafted and personalized to suit the particular needs and desires of a given user.

Similarly, one will realize that the system 10 could be used to create and sell lighting arrangements that are ideal for a given room. For example, a store selling lighting arrangements could display to a user on display devices 18 various potential or advisable lighting effects 24 designed to achieve a given function or to evoke a given mood or feeling. The user could see his or her own room as a procured image 20 lit in a number of different ways without going through the expensive, time consuming, and frustrating actual experimentation of demolition, rewiring, installing, testing, and, possibly, removal of different lighting options in his or her own physical room or building.

Again, the design advisor 74 could be employed to provide a user with suggestions from lighting experts 76, research sources 82, and prior art arrangements 80. With this, buyers could be assured that the lighting he or she selects will be pleasing and effective both in function and in optimally evoking the desired mood 46 or effect 61. Also, sellers of lighting arrangements would be likely to enjoy increased sales to purchasers who are comfortable doing so knowing that their money is being spent wisely and effectively.

With this, value will be truly added to the sale since the system 10 is, in effect, a personal previewer and refiner. The universal, ultra-high definition color, light, and object rendering, advising, and coordinating system 10 can in effect improve the value of existing and future possessions. Still further, the system 10 can also potentially improve the user's quality of life, personal productivity, and, ideally, happiness.

The same case can be made relative to retailers of roofing materials who have endured a substantial constraint when it comes to recommending colors for any house or building. Similarly, customers of paint retailers need not feel they are taking a risk in their desire to individualize their homes, offices, buildings, or the like by using colors that they are attracted to because they can see on the display device 18 exactly what the particular color will look like before investing. With this, risk will be totally eliminated while successful and value enhancing choices and thus customer satisfaction will be dramatically expanded and improved.

The same could be accomplished relative to a person seeking new clothing or a complete personal makeover. There, the system 10 would again be able to accommodate and manipulate reference images 22, procured images 20, lighting effects 24, and design goals 44. Relative to clothing, one could suppose a plurality of possible design goals 44 including fashion goals such as dressing for success, casual dress, slimming or heightening effects, and still further effects. Again, the user could input full front, back, and side photos of themselves and other constraining elements 78 including articles of clothing already owned and budget considerations.

A person using such a system 10 advantageously could see him or herself attired in an array of clothing possibilities automatically without the expense and time that would otherwise be required where a user could see how clothing would fit and look only upon being tried on, possibly only after being purchased. Furthermore, a retailer could retain in memory any articles of clothing or other personal articles that are available to the retailer without regard to whether the articles are actually in stock. Such articles can be virtually tried on even where they are not in stock such that they can be sold and delivered. Whether the articles come from a central location or from the retailer, the user can receive the articles quickly and with confidence that they will be acceptable in all respects. With this, the retailer is, in effect, never out of stock.

In such a system, the user's own body may be among the reference images 22 such that the display images 26 would allow a user to model a proposed clothing purchase virtually. With this, the user could also view a proposed clothing purchase in combination with reference images 22 of what the user already owns such that he or she will no longer have to guess whether the color and style of a new acquisition he or she is considering will compliment, match, or clash. Where desired, the user can employ the assistance of the design advisor 74 for suggestions as to clothing styles, colors, and the like. With the elimination of a user's need to guess, returns, which now run as high as 30% or more, will diminish greatly thereby yielding a huge benefit to retailers and consumers. Of course, the system 10 can be used to similar advantage relative to makeup, hairstyles, jewelry, and substantially any other potential purchase or change that a user might contemplate.

For greatest advantage, procured images 20 and reference images 22 could be retained on a portable memory medium 84. The memory medium 84 could take a number of forms. For example, the portable memory medium 84 could comprise a computer disk, such as a high capacity compact disk, DVD, or similar memory disk. As a result, the procured images 20 of a given home, building, room, landscape, car, wardrobe, personal image, object, product, or the like could be retained on a given portable memory medium 84 along with any reference images 22 that may have been associated with the procured images 20 to produce display images 26.

With this, one could envision users having their own specially obtained personal memory disk or medium 84 that retains display images 26 of the user's own rooms, homes, buildings, vehicles, boats, airplanes, landscapes, or other possessions including furniture, personal images, jewelry, accessories, clothing and the like. These display images 26 will further include an identification of size for scale adaptation as in step 154, type of light and its orientation 24, and will be obtained through the use of specially calibrated and coordinated equipment, such as the memory device 14, the image procuring device 12, the processor 16, and the portable memory medium 84 to facilitate further their coordination and integration into the display device 18.

Also, central locations 86, such as department stores, hardware stores, lighting stores, paint stores, auto dealers, lumber yards, the offices of architects, builders, real estate brokers, and interior designers and decorators, and myriad other locations could be possessed of the specially calibrated and coordinated processor 16, memory device 14, and display device 18. Under this arrangement, the user could bring the personal memory disk 84 to the central location 86 to preview proposed purchases or changes as display images 26 and to gain a truly accurate prediction of how they will look and integrate with other possessions or individualized environments, possibly with the benefit of design genius derived from the design advisor 74.

With this and by means that one skilled in the art would find obvious after reading this patent, a user could have specially procured display images 26 of a room, building, landscape, product, color, or person and then view those display images 26 on the display device 18 of the central location 86. Again by means one of skill in the art would appreciate from this disclosure, the building elements 38, which include additions and modifications, and the decorative elements 40 of reference images 22, such as things to be sold, retained by the central location 86 could then be interposed and substituted into the display images 26 already disposed on the portable memory medium 84 so that the user might gain an appreciation as to how the purchase of new products or proposed modifications to his or her person, room, building, vehicle, landscape, or the like would appear in actuality.

This feature will prove invaluable relative to an immense array of consumer goods from flooring, to art work, to accessories, to wardrobes, to jewelry, antiques, rugs, autos, boats, and to still further residential, commercial, and industrial products. This is particularly true when one appreciates that one of the greatest advantages in buying or selling is or would be the ability to see something actually in one's home, on one's body, relative to one's car, or in other situations prior to undertaking potentially great effort, expense, and possibly irreversible demolition and construction. For example, Oriental rug merchants sometimes arrange to display a given rug in a special client's home. Unfortunately, such services are not available or practical for most products and is particularly impractical for many very expensive or far away items such as antiques. Advantageously, with the present system 10 what is presently impracticable can become convenient and routine thereby greatly improving customer satisfaction and reducing previously required effort in attempting to obtain optimally desirable products and environments.

To be complete, one will note that psychological studies have proven that people have far more positive reactions to large screens than small screens. Again, this relates to man being visually oriented. When ultra high definition and perfect color representation are added, as with the present invention's preferred 40-60 inch display device 18, it becomes truly useful beyond entertainment. The Dot Com experience proved, among other things, that small screens were grossly inadequate for product marketing. These enhanced mechanical aspects of the invention alone represent significant advancements over existing mediums, such as ordinary TV screens and computer monitors. With the integration of other features, it becomes an exceptionally useful tool for product evaluation, construction and other important applications outlined above.

The only drawback is one of expense, which may be one reason why the level of ultra high definition and color clarity representation required here is not available commercially today at any price. To achieve this level of excellence, one which is indispensable for the true accuracy necessary to achieve a virtual reality for these critical applications, the knowledgeable observer will be aware that the present cost in production for such a system 10 could run as high as $250,000. This extreme expense could arguably relegate it to the commercial realm. However, in light of the advantages that can be reaped by the present invention when properly utilized, commercial success is nonetheless achievable.

In light of the above, one skilled in the art will appreciate that the present invention comprises a marked advance over the prior art. The universal ultra-high definition, accurate color, light, and object rendering, advising, and coordinating system 10 enables a user to view proposed changes to his or her own room, home, building, auto, truck, wardrobe, person, landscaping, objects, and myriad other applications in true accuracy. The rendering system 10 allows for the accurate display of colors 28 and 36, lighting effects 24, proper scales, and more in a manner that ensures true, accurate, and consistent displaying of display images 26 and proposed changes thereto. With this, the universal ultra-high definition color, light, and object rendering advising, and coordinating system 10 advantageously enables interior and exterior design, rehabilitation, addition, and new construction function to be carried out and optimized in an effective, value adding, low cost and convenient manner.

As is the case with many inventions, the present invention for a universal ultra-high definition color, light, and object rendering, advising, and coordinating system 10 is subject to a wide variety of embodiments. However, to ensure that one skilled in the art will be able to understand and, in appropriate cases, practice the present invention, certain preferred embodiments of the broader invention revealed herein are described above. Certainly, those skilled in the art can conceive of alternative embodiments. For instance, those with the major features of the invention in mind could craft embodiments of the invention which incorporate those major features while not incorporating all of the features included in the preferred embodiments.

With the foregoing in mind, the claims set forth below define the scope of protection to be afforded the inventors, and those claims shall be deemed to include equivalent constructions insofar as they do not depart from the spirit and scope of the present invention. In this respect, it should be particularly noted that certain elements in this disclosure and in the claims are expressed as means for performing a specific function, at times without the recital of structure or material. As the law demands, those claims incorporating elements in such forms shall be construed to cover not only the corresponding structure and material expressly described in the foregoing specification but also equivalents thereof.

We claim as deserving the protection of Letters Patent:

1. A universal, ultra-high definition color, light, and object rendering, advising, and coordinating system for displaying colors, objects, and light and enabling an accurate rendering of a color, room, building, object, landscape, or person, the system comprising:
    an image procuring device for procuring input images;
    a memory device;
    a plurality of reference images retained by the memory device wherein the reference images include structural elements, flooring, ceiling elements, and decorative elements;
    a processor; and
    a display device;
    wherein the image procuring device, the memory device, the processor, and the display device are specially calibrated and automatically coordinated to work together to ensure that colors and input images viewed and procured in situ by the image procuring device will be identically displayed on the display device including the input images in an in situ depiction;
    whereby a user can predict the appearance of an interior or exterior of a building, home, landscape, person, or other object or element with accuracy.

2. The system of claim 1 wherein the image procuring device comprises a digital camera.

3. The system of claim 2 wherein the image procuring device comprises a still camera for providing still images of a color, room, building, landscape, product, person, or other structure.

4. The system of claim 2 wherein the image procuring device comprises a motion camera for providing moving images of a color, room, building, landscape, product, person, or other element or structure.

5. The system of claim 4 wherein the motion camera comprises a means for providing moving images in three-dimensions.

6. The system of claim 5 further comprising a means for providing moving images in virtual reality.

7. The system of claim 1 wherein the display device comprises an ultra-high definition display screen.

8. The system of claim 1 wherein the reference images include reference colors.

9. The system of claim 1 wherein the decorative elements include furniture, shrubbery, wallpaper, rugs, curtains, blinds, window shades, and trim.

10. The system of claim 1 further comprising a means for automatically suggesting one or more reference images based on a user-selected parameter wherein the user-selected parameter comprises a structural style or mood effect wherein the reference images include building elements, decorative elements, and colors, and wherein the reference image is automatically coordinated by the processor with the user-selected parameter.

11. The system of claim 10 wherein the user-selected parameter comprises an input image that has been procured by the image procuring device.

12. A universal, ultra-high definition color, light, and object rendering, advising, and coordinating system for displaying colors, objects, and light and enabling an accurate rendering of a color, room, building, object, landscape, or person, the system comprising;
    an image procuring device for procuring input images;
    a memory device;
    a plurality of reference images retained by the memory device wherein the reference images include building elements, decorative elements, and colors;
    a processor;
    a display device; and
    a means for suggesting one or more reference images based on a user-selected parameter wherein the reference image is automatically coordinated by the processor with the user-selected parameter wherein the user-selected parameter comprises a design goal input by a user wherein the design goal comprises a structural style or a mood effect and wherein the means for suggesting one or more reference images comprises a means for suggesting building elements, decorative elements, and colors that automatically coordinate with the structural style, mood effect, or other design goal input by the user;

wherein the image procuring device, the memory device, the processor, and the display device are calibrated and coordinated to ensure that a color viewed and procured in situ by the image procuring device will be identically displayed on the display device;

whereby a user can predict the appearance of an interior or exterior of a building, home, landscape, person, or other object or element with accuracy.

13. The system of claim 12 wherein the design goal input by a user includes desired furniture styles and decorating styles.

14. A universal, ultra-high definition color, light, and object rendering, advising, and coordinating system for displaying colors, objects, and light and enabling an accurate rendering of a color, room, building, object, landscape, or person, the system comprising:
   an image procuring device for procuring input images;
   a memory device;
   a plurality of reference images retained by the memory device wherein the reference images include building elements, decorative elements, and colors;
   a processor;
   a display device; and
   a means for displaying displayed elements and objects in a unified size scale on the display device wherein the means for displaying displayed elements and objects in a unified size scale automatically adapts the input images and the reference images to a unified, substantially identical scale;
   wherein the image procuring device, the memory device, the processor, and the display device are calibrated and coordinated to ensure that a color viewed and procured in situ by the image procuring device will be identically displayed on the display device;
   whereby a user can predict the appearance of an interior or exterior of a building, home, landscape, person, or other object or element with accuracy.

15. A. universal, ultra-high definition color, light, and object rendering, advising, and coordinating system for displaying colors, objects, and light and enabling an accurate rendering of a color, room, building, object, landscape, or person, the system comprising:
   an image procuring device for procuring input images;
   a memory device;
   a plurality of reference images retained by the memory device;
   a processor;
   a display device; and
   a means for providing a cost estimation as to the cost of a potential alteration, redecoration, addition, or construction of or to a given element or object;
   wherein the image procuring device, the memory device, the processor, and the display device are specially calibrated and automatically coordinated to work together to ensure that colors and input images viewed and procured in situ by the image procuring device will be identically displayed on the display device including the input images in an in situ depiction;
   whereby a user can predict the appearance of an interior or exterior of a building, home, landscape, person, or other object or element with accuracy.

16. The system of claim 15 further comprising a means for providing a time estimation as to the time required for a potential alteration, redecoration, addition, or construction of or to a given element or object.

17. A universal, ultra-high definition color, light, and object rendering, advising, and coordinating system for displaying colors, objects, and light and enabling an accurate rendering of a color, room, building, object, landscape, or person, the system comprising:
   an image procuring device for procuring input images wherein the image procuring device comprises a motion camera for providing moving images of color, room, building, landscape, product, person, or other element or structure;
   a memory device;
   a processor;
   a plurality of reference images retained by the memory device wherein the reference images include building elements, decorative elements, and colors;
   a display device;
   a means for enabling a selective manipulation of the location and orientation of the procured input images on the display device;
   a means for automatically adapting the input images and the reference images to a unified, substantially identical scale; and
   a means for displaying displayed elements and objects in a unified size scale;
   wherein the image procuring device, the memory device, the processor, and the display device are calibrated and coordinated to ensure that a color viewed and procured in situ by the image procuring device will be identically displayed on the display device;
   whereby a user can predict the appearance of an interior or exterior of a building, home, landscape, person, or other object or element with accuracy.

18. The system of claim 17 further comprising a means for providing a cost estimation as to the cost of a potential alteration, redecoration, addition, or construction of or to a given element or object.

19. A. universal, ultra-high definition color, light, and object rendering, advising, and coordinating system for displaying colors, objects, and light and enabling an accurate rendering of a color, room, building, object, landscape, or person, the system comprising:
   an image procuring device for procuring input images;
   a memory device;
   a processor;
   a display device; and
   a means for providing a display of simulated light sources on the display device to bathe the displayed image in a source of light wherein the means for providing simulated light sources comprises a means for controlling a type of light source to be simulated on the display device from among a plurality of different types of light sources wherein the means for providing simulated light sources enables a user to select from light source types from the group consisting of incandescent light, fluorescent light, full spectrum light, and natural sunlight;
   wherein the image procuring device, the memory device, the processor, and the display device are calibrated and coordinated to ensure that a color viewed and procured in situ by the image procuring device will be identically displayed on the display device;
   whereby a user can predict the appearance of an interior or exterior of a building, home, landscape, person, or other object or element with accuracy.

20. The system of claim 19 wherein the means for providing simulated light sources further enables a user to select a mixed light display situation.

21. The system of claim 20 wherein the means for providing simulated light sources further enables a user to adjust the relative intensity of displayed light sources.

22. The system of claim 19 wherein the means for providing simulated light sources comprises a means for controlling a location and orientation of the light source to be simulated on the display device.

23. The system of claim 19 wherein the means for providing simulated light sources further enables a user to select a mixed light display situation.

24. The system of claim 23 wherein the means for providing simulated light sources further enables a user to adjust the relative intensity of displayed light sources.

25. The system of claim 19 wherein the means for providing simulated light sources further enables a user to choose to simulate the display of light as emanating from a light fixture.

26. The system of claim 19 wherein the means for providing simulated light sources further enables a user to choose to display light as emanating from within a shielded structure.

27. The system of claim 19 further comprising a portable memory medium for enabling a user to retain and transport procured input images and reference images.

28. A universal, ultra-high definition color, light, and object rendering, advising, and coordinating system for displaying colors, objects, and light and enabling an accurate rendering of a color, room, building, object, landscape, or person, the system comprising:
   an image procuring device for procuring input images;
   a memory device;
   a processor;
   a display device;
   a means for sequentially displaying a plurality of display images and for allowing a user to select preferred display images from the plurality of display images for continued or repeated display wherein the means for sequentially displaying a plurality of display images displays each display image for a predetermined amount of display time through a first display round and then for progressively increased amounts of display time through succeeding rounds;
   wherein the image procuring device, the memory device, the processor, and the display device are calibrated and coordinated to ensure that a color viewed and procured in situ by the image procuring device will be identically displayed on the display device;
   whereby a user can predict the appearance of an interior or exterior of a building, home, landscape, person, or other object or element with accuracy.

29. The system of claim 12 wherein the user-selected parameter includes Feng Shui principles of article and material placement and orientation.

30. The system of claim 12 wherein the means for suggesting one or more reference images further comprises a means for suggesting building elements, decorative elements, and colors dependent on designer input, design research, and historic information.

31. The system of claim 14 wherein the means for displaying displayed elements and objects in a unified scale further provides automatically accurate perspective depictions of displayed elements and objects in varied orientations and locations.

32. The system of claim 14 wherein the means for displaying displayed elements and objects in a unified scale further comprises a means for permitting a user to input a scale of a procured input image.

33. A universal, ultra-high definition color, light, and object rendering, advising, and coordinating system for displaying colors, objects, and light and enabling an accurate rendering of a color, room, building, object, landscape, or person, the system comprising:
   an image procuring device for procuring input images;
   a memory device;
   a plurality of reference images retained by the memory device wherein the reference images include structural elements, flooring, ceiling elements, and decorative elements;
   a processor;
   a display device;
   wherein the image procuring device, the memory device, the processor, and the display device are specially calibrated and coordinated to work together to ensure that colors and input images viewed and procured in situ by the image procuring device will be identically displayed on the display device including the input images in an in situ depiction;
   a means for suggesting one or more reference images based on a user-selected parameter wherein the reference image is automatically coordinated by the processor with the user-selected parameter wherein the user-selected parameter comprises a design goal input by a user wherein the design goal comprises a structural style or a mood effect and wherein the means for suggesting one or more reference images comprises a means for suggesting building elements, decorative elements, and colors that automatically coordinate with the structural style, mood effect, or other design goal input by the user;
   a means for displaying displayed elements and objects in a unified size scale on the display device wherein the means for displaying displayed elements and objects in a unified size scale automatically adapts the input images and the reference images to a unified, substantially identical scale; and
   a means for providing a display of simulated light sources on the display device to bathe the displayed image in a source of light wherein the means for providing simulated light sources comprises a means for controlling a type of light source to be simulated on the display device and a means for controlling a location and orientation of the light source to be simulated on the display device;
   whereby a user can predict the appearance of an interior or exterior of a building, home, landscape, person, or other object or element with accuracy.

* * * * *